(12) United States Patent
Nakamura (10) Patent No.: US 7,158,075 B2
(45) Date of Patent: Jan. 2, 2007

(54) VEHICLE RADAR APPARATUS

(75) Inventor: Mitsuo Nakamura, Nagoya (JP)

(73) Assignee: DENSO Corporation, Kariya (JP)

( * ) Notice: Subject to any disclaimer, the term of this patent is extended or adjusted under 35 U.S.C. 154(b) by 121 days.

(21) Appl. No.: 11/100,130

(22) Filed: Apr. 6, 2005

(65) Prior Publication Data

US 2005/0225478 A1  Oct. 13, 2005

(30) Foreign Application Priority Data

Apr. 7, 2004  (JP) .............................. 2004-113501

(51) Int. Cl.
*G01S 13/93* (2006.01)
(52) U.S. Cl. .............................. 342/70; 342/71; 342/82
(58) Field of Classification Search ............ 342/70–72, 342/82–88, 173, 174, 195
See application file for complete search history.

(56) References Cited

U.S. PATENT DOCUMENTS

| | | | | |
|---|---|---|---|---|
| 5,291,202 A * | 3/1994 | McClintock | ................. | 342/16 |
| 5,337,052 A * | 8/1994 | Lohrmann et al. | ............ | 342/68 |
| 5,583,512 A * | 12/1996 | McEligot | .................... | 342/189 |
| 6,069,581 A * | 5/2000 | Bell et al. | ..................... | 342/70 |
| 6,798,375 B1 * | 9/2004 | Brosche | ....................... | 342/159 |
| 2003/0179131 A1 * | 9/2003 | Brosche | ....................... | 342/159 |
| 2003/0210174 A1 * | 11/2003 | Nakamura | .................... | 342/70 |
| 2004/0169840 A1 | 9/2004 | Hoashi et al. | ............. | 356/4.01 |
| 2005/0200833 A1 * | 9/2005 | Nakamura et al. | ......... | 356/4.07 |
| 2005/0225478 A1 * | 10/2005 | Nakamura | .................... | 342/70 |
| 2005/0243301 A1 * | 11/2005 | Takagi | ....................... | 356/4.07 |

FOREIGN PATENT DOCUMENTS

| JP | 2002-040139 | | 2/2002 |
|---|---|---|---|
| JP | 2005300233 A | * | 10/2005 |

* cited by examiner

*Primary Examiner*—John B. Sotomayor
(74) *Attorney, Agent, or Firm*—Harness, Dickey & Pierce, PLC (57) ABSTRACT

A radar apparatus for a vehicle radiates laser beams and integrates a plurality of received signals corresponding to the same plurality of successively radiated laser beams. Thus, the sensitivity to detect a beam-reflecting body is improved. Further, a sampling start timing of the received signals is delayed as a delay time relative to a radiation timing of the laser beam corresponding to the received signal. By changing the delay time, beam-reflecting bodies throughout all detection distances can be detected even when the number of sampling points is made smaller than the number of sampling points required to cover all the detection distances in order to reduce the integration processing load.

6 Claims, 5 Drawing Sheets

VEHICLE RADAR APPARATUS

CROSS REFERENCE TO RELATED APPLICATION

This application is based on and incorporates herein by reference Japanese Patent Application No. 2004-113501 filed on Apr. 7, 2004.

FIELD OF THE INVENTION

The present invention relates to a radar apparatus provided on a vehicle for radiating a plurality of transmission waves over a predetermined angular range spread at least in the transversal direction of the vehicle and detecting a body reflecting the radiated transmission waves based on a signal representing the intensities of the reflected waves.

BACKGROUND OF THE INVENTION

Among conventional radar apparatuses, for example, JP 2002-40139A discloses a radar apparatus provided on a vehicle for radiating a transmission wave such as an optical wave or a millimeter wave in the forward direction and detecting a body located in front of the vehicle as a body reflecting the transmission wave based on the reflected wave. This radar apparatus is used for generating a warning when detecting a situation in which a distance relative to a preceding vehicle becomes short. In addition, this radar apparatus is also used for controlling the speed of the vehicle so as to maintain the inter-vehicle distance relative to a preceding vehicle.

In the vehicle radar apparatus, the radiation direction of a laser beam emitted by a laser diode is changed by using a polygon mirror, which is driven to rotate. The radar apparatus thus radiates a plurality of laser beams over predetermined angular ranges spread in the transversal direction and the vertical direction of the vehicle. When a beam-reflecting body reflects some of the laser beams, the reflected laser beams are received through a beam-receiving lens employed in the radar apparatus.

The reflected beams received through the beam-receiving lens are lead to a photo-sensitive device, which outputs a voltage signal representing the intensities of the received laser beams. Then, the distance between the radar apparatus and the beam-reflecting body is measured based on a interval of time lapsing since the radiation of the laser beams till the voltage signal reaches a reference voltage. In addition, the position of the beam-reflecting body in the transversal direction of the vehicle and the vertical direction is determined based on the radiation angle of the laser beam.

The beam-reflecting body, that is, an object to be detected by the radar apparatus of a vehicle, is another vehicle leading ahead of the vehicle. Usually, the preceding vehicle has a reflector for reflecting a transmission wave such as a laser beam on the rear face of the vehicle as a reflector with a high reflectance. In addition, the vehicle body of the preceding vehicle also has a relatively high reflectance even though the reflectance of the vehicle body is not as high as the reflectance of the rear face. Thus, the vehicle radar apparatus is capable of detecting a preceding vehicle at a distance in front of the vehicle by more than 100 meters.

However, the output intensity of a transmission wave such as a laser beam is limited by a variety of restrictive conditions. As a result, the output intensity determines the upper limit of the distance relative to a preceding vehicle to be detected.

When dirt or snow covers the rear face of a preceding vehicle, the intensity of a beam reflected by the rear face decreases. In this case, it is difficult to distinguish received signal components each having an intensity representing a beam reflected by the preceding vehicle from noise components attributed to a variety of causes. As a result, the distance which the conventional radar apparatus of a vehicle is capable of detecting a preceding vehicle is limited and not satisfactory.

USP 2004/0169840A1 proposes a vehicle radar apparatus to counter the above drawbacks. This proposed radar apparatus radiates a plurality of laser beams in a predetermined angular range spread in the transversal direction of the vehicle. The radiated laser beams are reflected by a beam-reflecting body such as a preceding vehicle as reflected laser beams represented by a plurality of received signals. The radar apparatus then finds an integration value of the received signals obtained in succession as a result of reflection of the successively radiated laser beams, which are adjacent to each other.

Thus, even when the intensity of reflection beams reflected by a beam-reflecting body decreases due to low reflective materials, the received-signal components representing the reflected beams are integrated as if they are amplified. As a result, even when the distance relative to a beam-reflecting body as a detection object such as a preceding vehicle increases or the intensity of reflection beams reflected by a beam-reflecting body decreases, desired detectable distance relative to a beam-reflecting body can be attained.

In a process carried out by the radar apparatus of a vehicle to find an integration value of a plurality of received signals, the radar apparatus shifts the group of received signals serving as an object of the integration over the range of radiation. Thus, it is possible to maintain the desired detectable angular resolution of the vehicle radar apparatus.

Figure 7:
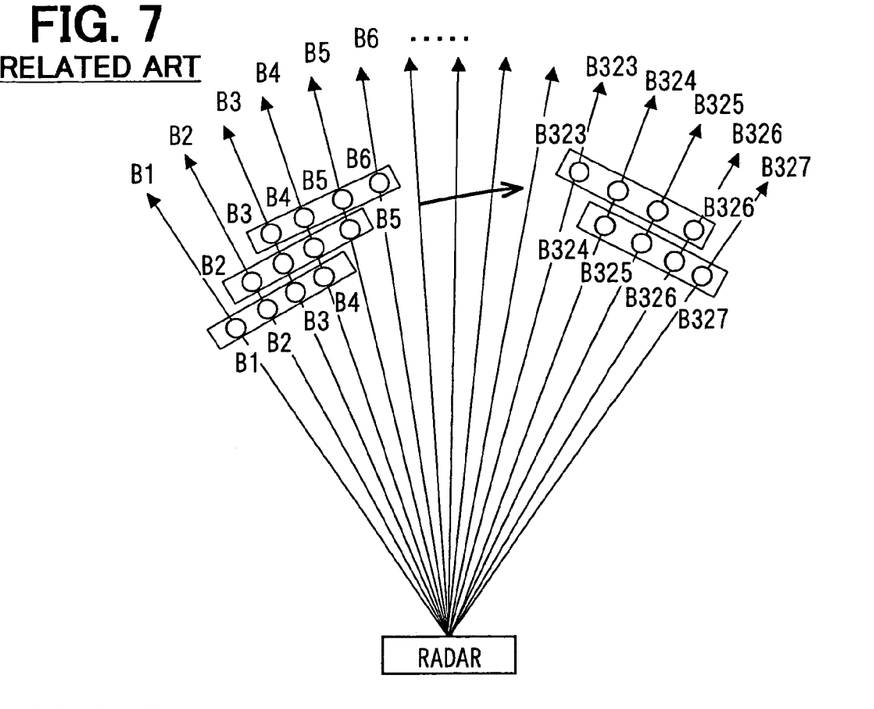
FIG. 7 is an schematic diagram showing an integration process for a case in which the number of received signals pertaining to the integration group is four according to a related art radar apparatus.

The integration-type radar apparatus for a vehicle is shown in FIG. 7. It is to be noted in FIG. 7 that 327 laser beams (B1 to B327) are radiated in a range spread in the transversal direction of the vehicle and the number of received signals to be integrated for a group of integration is four. The integration is carried out on received signals representing four successive laser beams adjacent to each other.

In addition, the group of received signals as an object of integration is shifted by an interval corresponding to one received signal at a time over the range of radiation so that all received signals are subjected to the integration process. That is, first, received signals representing laser beams with scan numbers (or beam numbers) of B1 to B4 are designated as received signals of a group of integration. Then, the group of integration is shifted over the radiation range to the right by an interval corresponding to one received signal so that the group includes received signals representing laser beams with beam numbers of B2 to B5. Thereafter, this process to shift the group of integration by an interval corresponding to one received signal at one time is carried out in the same way repeatedly till the group of integration covers received signals representing the four right-most mutually adjacent laser beams with beam numbers of B324 to B327.

Figure 8:
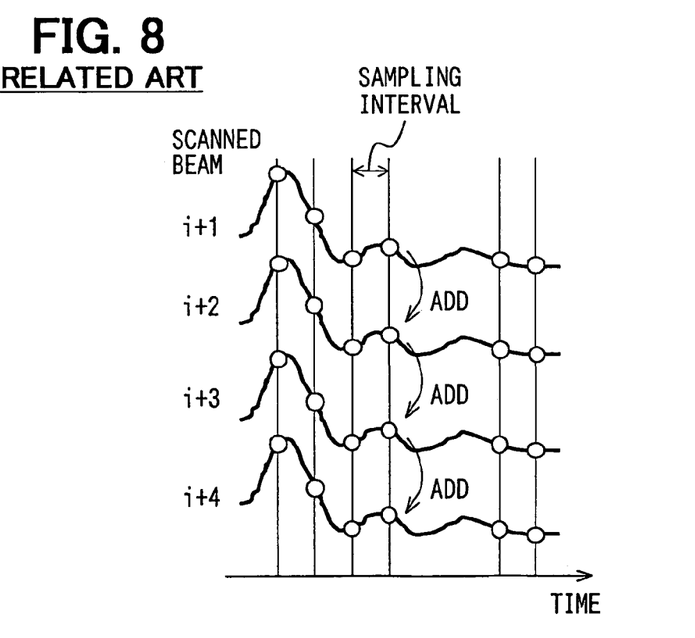
FIG. 8 is a signal diagram showing signals developed in a process to integrate a plurality of received signals in the related art radar apparatus.

In synchronization with the operation to sequentially designate received signals as signals included in the group of integration, a process to integrate the received signals included in the group of integration is carried out. The integration process is carried out as follows. As shown in FIG. 8, the four received signals i+1 to i+4 of the integration group are sampled with the same sampling timing by using an A/D converter and converted into digital values in an A/D conversion process. Then, an integration value of all the digital values for the sampling timing is found. This process to find an integration value of all the digital values is carried out for every sampling timing.

The A/D conversion process needs to be carried out because the received signals are each an analog signal. Since the received signals each represent one of four laser beams, the process to find the integration value of the digital values obtained as a result of the A/D processing carried out with the same sampling timing produces a result representing the four laser beams. From the radar-apparatus point of view, the digital values obtained as a result of the A/D processing carried out with the same sampling timing represent received-signal components of reflection waves reflected by a beam-reflecting body at the same distance. Thus, by integrating these digital values obtained as a result of the A/D processing, the S/N ratio of the received signals representing reflection waves reflected by a beam-reflecting body can be improved.

In order to carry out the integration process of finding an integration value of digital values obtained as a result of the A/D processing for every sampling timing as shown in FIG. 8 for a sampling frequency of 50 MHz, for example, it is necessary to perform the integration process of finding an integration value of four digital values obtained as a result of the A/D processing at a frequency of 50 MHz or at intervals of 20 ns.

It is to be noted that, when a laser beam is used as the transmission wave, the distance from the radar apparatus to a beam-reflecting body is a half of a total distance, which is traveled by the laser beam since the time the beam is radiated till the time the beam reflected by the beam-reflecting body is received by the radar apparatus. Thus, in the case of an A/D conversion sampling frequency of 50 MHz or a sampling interval of 20 ns, the detected-distance resolution can be found as one half of the product of the velocity of the laser beam and the sampling interval. Since the velocity of the laser beam is 0.3 m/ns, the detected-distance resolution can be found as follows.

0.3 m/ns×20 ns/2=3 m

In an operation to detect a beam-reflecting body such as a preceding vehicle running ahead of the vehicle having the radar apparatus, a distance resolution corresponding to an interval of 3 m is rather a coarse or rough distance interval. Thus, in order to improve the distance resolution, it is necessary to increase the sampling frequency to a value higher than 50 MHz.

The integration processing is carried out repeatedly as many times as the A/D-conversion and sampling processes of received signals in order to complete the integration processing for one group of integration. Since there are a large number of integration groups, the processing load of execution the integration processing is extremely heavy. In the example shown in FIG. 7, the number of integration groups is 324.

In order to counter this problem, in the integration-type radar apparatus, for a given sampling frequency, the detectable distance relative to a beam-reflecting body such as a preceding vehicle is basically determined by a sampling-point count of the A/D-conversion. The sampling-point count is defined as the number of sampling points in a sampling interval, which is the reciprocal of the sampling frequency. In the case of an A/D-conversion sampling-point count of N and a sampling process is started at the same time as the radiation of a laser beam, for example, for a sampling frequency of 50 MHz, a wave reflected by a beam-reflecting body at a distance of up to 3N (m) can be detected as a received signal. Thus, when it is desired to detect a preceding vehicle at a distance of up to 150 m, it is necessary to carry out a sampling process N (=50=150/3) times.

Since the sampling-point count of the A/D-conversion determines the number of integration processes for each group of integration, the sampling-point count has a great effect on the processing load. When the processing load is reduced by simply decreasing the sampling-point count, however, the detectable distance also becomes shorter due to the decreased sampling-point count. In turn, a short detectable distance leads to low detection performance of the radar apparatus. When the vehicle having the radar apparatus travels at a high speed, the vehicle needs to detect a preceding vehicle at a distance of at least 100 m in some cases. Thus, the detection performance of the radar apparatus must be improved.

SUMMARY OF THE INVENTION

It is thus an object of the present invention to provide an integration-type vehicle radar apparatus capable of reducing processing load of an integration process without lowering detection performance.

A vehicle radar apparatus according to the present invention integrates a predetermined number of received signals generated as signals corresponding to the same number of successively radiated transmission waves. Thus, even when the intensity of each received-signal component representing the intensity of a reflection wave reflected by a beam-reflecting body is small, by integrating a predetermined number of received signals, the intensities of received signals representing the reflection waves are converted into an amplified intensity.

Noise components included in the received signals due to a variety of causes are basically random. Therefore, an amplitude resulting from the operation to integrate a predetermined number of received signals as the resultant amplitude of the noise components is small even when the predetermined number of received signals is integrated. Thus, by integrating the predetermined number of received signals, the S/N ratio of the received-signal components each representing a reflection wave reflected by a beam-reflecting body can be increased. As a result, a beam-reflecting body can be detected even when the body is not so highly reflective.

When the integration process is simply carried out for every predetermined number of received signals, however, a detection resolution resulting from the integration process in the transversal direction of the vehicle lowers to a resolution equal to a predetermined multiple of the detection resolution provided by each individual received signal. For this reason, an integration group succeeding any specific integration group is set such that the specific integration group is shifted to the position of the succeeding integration group by fewer received signals than received signals pertaining to each of the integration groups so that some received signals are included in a predetermined number of such adjacent integration groups to result in adjacent integration groups partially overlapping each other. Thus, while an integration process is being carried out on a predetermined number of received signals, it is possible to maintain a resolution finer than that provided by the predetermined number of received signals.

While integration groups each consisting of a predetermined number of received signals subjected to integration processing are set, received signals pertaining to each of the integration groups are subjected to an integration process. Thus, in a process to detect a beam-reflecting body, it is possible to improve the sensitivity of detection of the beam-reflecting body. It is also possible to prevent the detection resolution in the transversal direction of the vehicle from lowering.

During the integration process, however, in every group consisting of a predetermined number of received signals subjected to integration processing, pieces of digital data obtained at the same sampling point are subjected to integration for every set of such pieces of digital data. Thus, the larger the sampling-point count, the larger the amount of the integration processing and hence the heavier the processing load. In order to solve this problem, it is necessary to adjust a delay time of a timing to start an operation to sample received signals as a delay time relative to a timing to radiate transmission waves corresponding to the received signals. By properly changing such a delay time, beam-reflecting bodies throughout all detection distances can be detected even when the sampling-point count is made smaller than a sampling-point count required for covering all the detection distances at which beam-reflecting bodies are to be detected. It is thus possible to reduce the processing load of the integration processing and, at the same time, prevent the detection performance of the radar apparatus from lowering.

As a result, the size of hardware used as an integration circuit can be reduced. Normally, the hardware includes as many integration circuits as sampling points to be used as circuits, which are each required for integrating pieces of digital data during a sampling interval due to the fact that the sampling operations must be carried out in an extremely short sampling interval.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
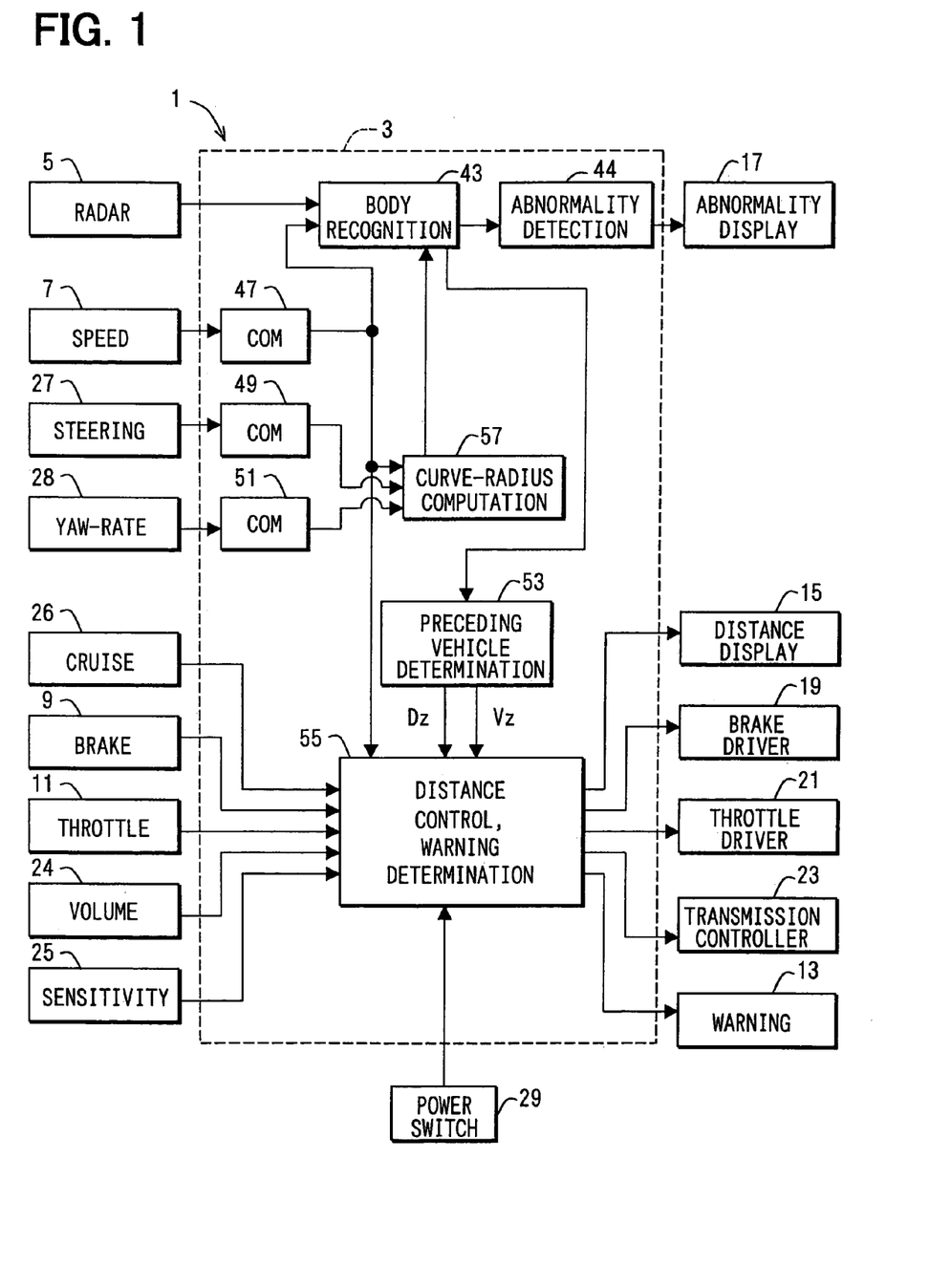
FIG. 1 is a block diagram showing a vehicle control apparatus employing a radar apparatus according to the present invention.

As shown in FIG. 1, a vehicle control apparatus 1 has an inter-vehicle distance the control ECU 3. The control ECU 3 has a configuration based on a microcomputer in addition to I/O input/Output) interfaces, a variety of driving circuits and a variety of detection circuits. This hardware configuration is generally the same as the ordinary configuration.

The control ECU 3 inputs a variety of detection signals from a laser radar sensor 5 serving as a vehicle radar apparatus, a vehicle speed sensor 7, a brake switch 9 and a throttle opening sensor 11. On the other hand, the control ECU 3 outputs a variety of driving signals to a warning-sound generator 13, a distance display unit 15, a sensor-abnormality display unit 17, a brake driver 19, a throttle driver 21 and an automatic transmission controller 23.

In addition, the control ECU 3 is also connected to a warning sound volume setter 24 for setting a warning sound volume, a warning sensitivity setter 25 for setting a sensitivity in a warning determination process, a cruise control switch 26, a steering sensor 27 for detecting the magnitude of an operation of a steering wheel not shown in the figure and a yaw-rate sensor 28 for detecting a yaw rate generated in the vehicle. The control ECU 3 also includes a power-supply switch 29, which is turned on to drive the control ECU 3 to start a predetermined process.

Figure 2A:
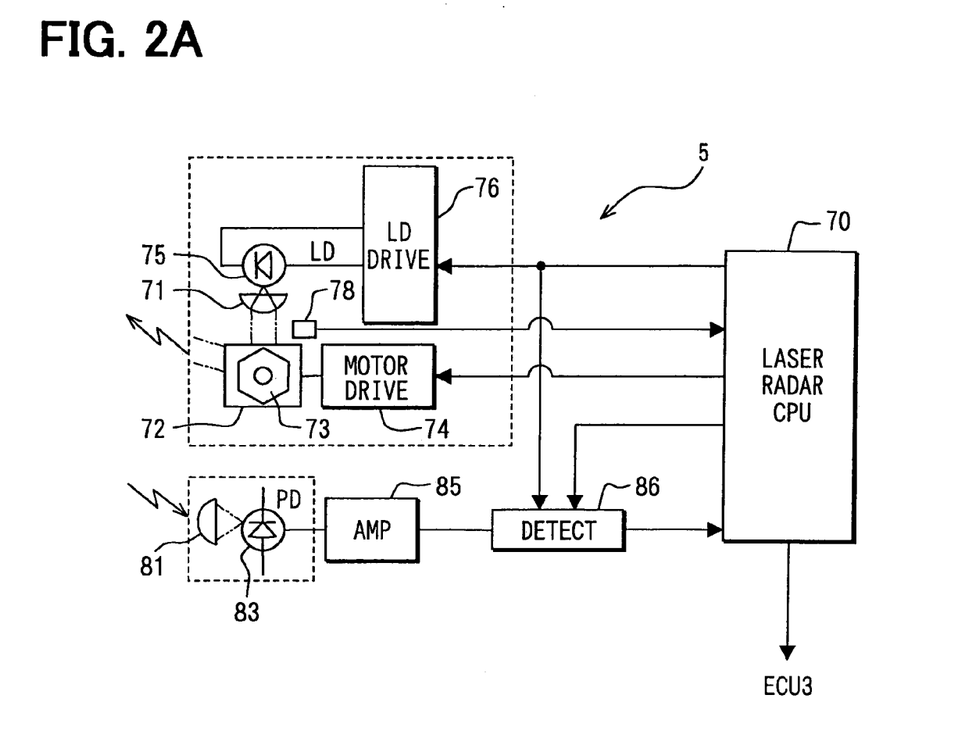
FIG. 2A is a block diagram showing a radar sensor functioning as the radar apparatus.

As shown in FIG. 2A, the laser radar sensor 5 has a beam emission unit, a beam reception unit and a laser radar CPU 70. The beam emission unit has a semiconductor laser diode 75 for radiating a pulse-shaped laser beam by way of a light-emitting lens 71 and a scanner 72. The semiconductor laser diode 75 is referred to as a laser diode 75. The laser diode 75 is connected to the laser radar CPU 70 through a laser diode drive circuit 76. An LD-driving signal output by the laser radar CPU 70 to the laser diode drive circuit 76 drives the laser diode 75 to radiate (or emit) a laser beam.

The scanner 72 is connected to the laser radar CPU 70 through a motor-driving unit 74. The scanner 72 includes a polygon mirror 73, which is provided so that the polygon mirror 73 can be rotated around a vertical axis. A motor-driving signal is output by the laser radar CPU 70 to the motor-driving unit 74 to rotate a motor for driving the polygon mirror 73. It is to be noted that the rotational position of the motor, which is not shown in the figure, is detected by a motor rotational position sensor 78 and passed on to the laser radar CPU 70.

Since the polygon mirror 73 has six mirrors having face fall angles different from each other, a laser beam can be radiated in a scanning movement discontinuously within predetermined angular ranges for the transversal (horizontal) direction of the vehicle and the vertical direction. In this way, the laser beam is radiated in a two-dimensional scanning operation in a scanning pattern 122 shown in FIG. 3.

Figure 3:
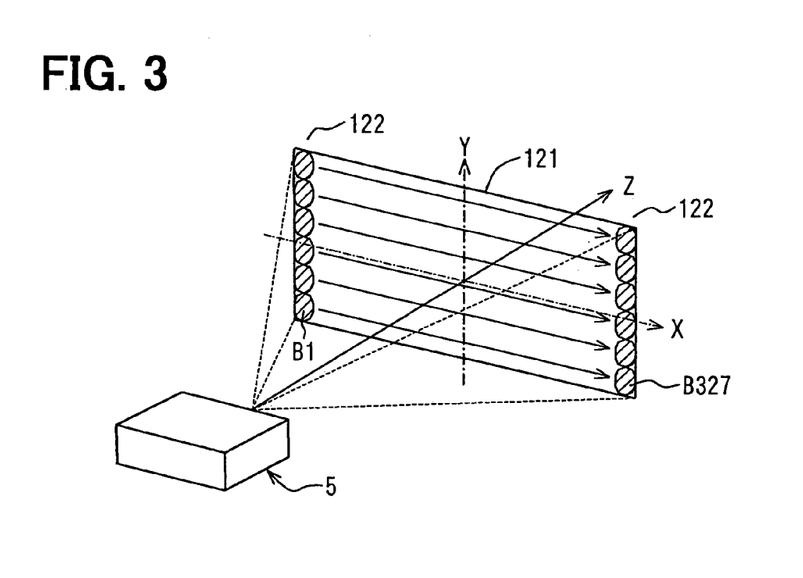
FIG. 3 is a schematic diagram showing a radiation area of the radar apparatus.

It is to be noted that the figure shows scanning patterns 122 of the laser beam only for cases in which the laser beam is radiated at the right and left edges of a detection area 121 of a beam-reflecting body. Patterns between the right and left edges are omitted. As an example, the scanning patterns 122 of the laser beam each have an elliptical beam spot. However, the scanning patterns 122 of the laser beam may have shapes not limited to the elliptical beam spot. That is, the scanning patterns 122 of the laser beam may each have a beam spot of any shape including the rectangular shape.

In addition, the transmission wave does not need to be a laser beam. For example, the transmission wave can be an ultrasonic wave or an electrical wave such as a millimeter wave. The laser radar sensor 5 is not limited to the above scanning method. That is, the laser radar sensor 5 may adopt any other method as long as the method is capable of measuring two azimuths in addition to a distance.

As shown in FIG. 3, the laser beam is radiated in a movement of sequentially scanning an X-Y plane perpendicular to a Z-axis coinciding with the radiation direction. The Y-axis coinciding with the vertical direction is taken as a reference direction and the X-axis coinciding with the transversal direction of the vehicle is taken as a scan direction. The laser beam is radiated to typically 327 points (B1 to B327 as in FIG. 7) while being shifted in the X-axis direction by a predetermined angle at one time. The radiation of the laser beam to the 327 points spread in the X-axis direction is repeated for six scan lines, which correspond to six mirror faces of the polygon mirror 73 of different angles of inclination, respectively. The six scan lines are parallel to the X-axis direction and separated from each other in the Y-axis direction. In FIG. 3, these six scan lines are lines connecting beam spots on the left edge to those on the right edge. Thus, for each of the first to sixth scan lines, 327 laser beams are radiated to the 327 points respectively.

When laser beams are radiated to the detection area 121, the laser beams are reflected by the detection area 121 and received by the laser radar sensor 5. In this case, the laser radar CPU 70 computes horizontal and vertical scan angles θx and θy representing radiation angles of the laser beams as well as a measured distance L, outputting the scan angles θx and θy as well as the measured distance L to the control ECU 3. It is to be noted that the horizontal scan angle θx of a radiated laser beam is defined as an angle between a line projecting the radiated laser beam on the X-Z plane and the Z-axis. On the other hand, the vertical scan angle θy of a radiated laser beam is defined as an angle between a line projecting the radiated laser beam on the Y-Z plane and the Z-axis.

The beam reception unit of the laser radar sensor 5 has a condenser lens 81 for converging laser beams reflected by a beam-reflecting body such as a preceding vehicle not shown in the figure and a light reception device (photo diode) 83 for outputting a voltage signal as a received signal representing the intensity of the converged reflected laser beams. The received signal output by the light reception device 83 is amplified by an amplifier 85. Then, a predetermined number of received signals are integrated and a signal representing a result of the integration is supplied to a detection circuit 86 for detecting the beam-reflecting body based on the signal representing the result of the integration.

Figure 2B:
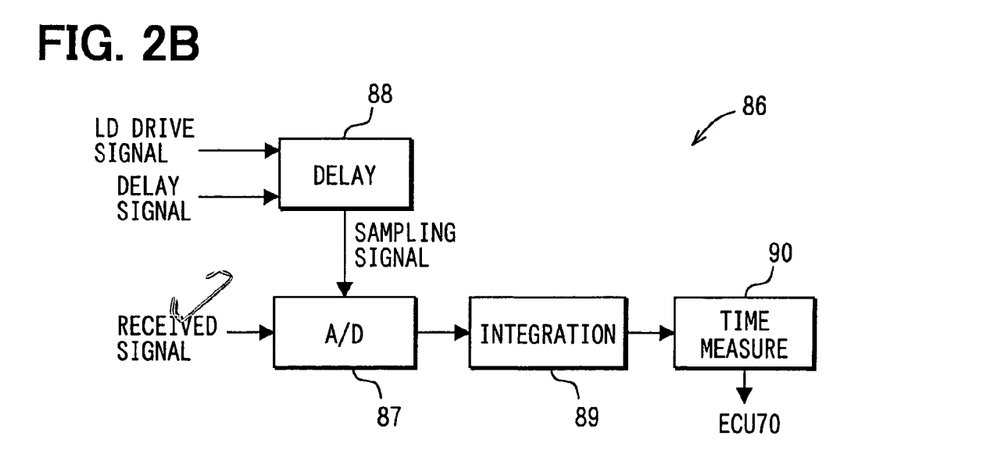
FIG. 2B is a block diagram showing a detection circuit employed in the radar sensor.

As shown in FIG. 2B, the detection circuit 86 has an A/D (analog-to-digital) conversion block 87. A received analog signal produced from the amplifier 85 is supplied to the A/D conversion block 87 to be sampled at sampling points in a predetermined interval of time and converted into digital data. A/D conversion values representing the digital data of the received signal are supplied to a parallel integration process block 89 to be integrated. In the parallel integration process block 89, a parallel integration process is carried out for each group of received signals each serving as an object of integration.

The sampling-point count of a received signal being subjected to an A/D conversion process in the A/D conversion block 87 is set at a value smaller than a sampling-point count required for covering all detection distances at which beam-reflecting bodies such as preceding vehicles are to be detected by the laser radar sensor 5. A typical maximum value of the detection distances is 150 m (meters). In a process to apply A/D conversion to a received analog signal sampled at sampling points during a sampling interval corresponding to a sampling frequency of 50 MHz, a sampling-point count of 50 is necessary. However, the sampling-point count of the A/D conversion block 87 is set at a value smaller than 50. Thus, the processing load borne by the parallel integration process block 89 can be reduced.

However, a small sampling-point count causes insufficient detection performance such as a shorter detectable distance. In order not to lower the detection performance while using a sampling-point count smaller than a value required for a detection distance of beam-reflecting bodies to be detected, the detection circuit 86 is provided with a delay block 88 for delaying the sampling interval of received signals and giving a delayed sampling start command to the A/D conversion block 87. Specifically, the delay block 88 delays the sampling interval by a delay time indicated by a delay request signal received from the laser radar CPU 70 as a signal representing a delay time relative to the LD-driving signal.

Figure 4:
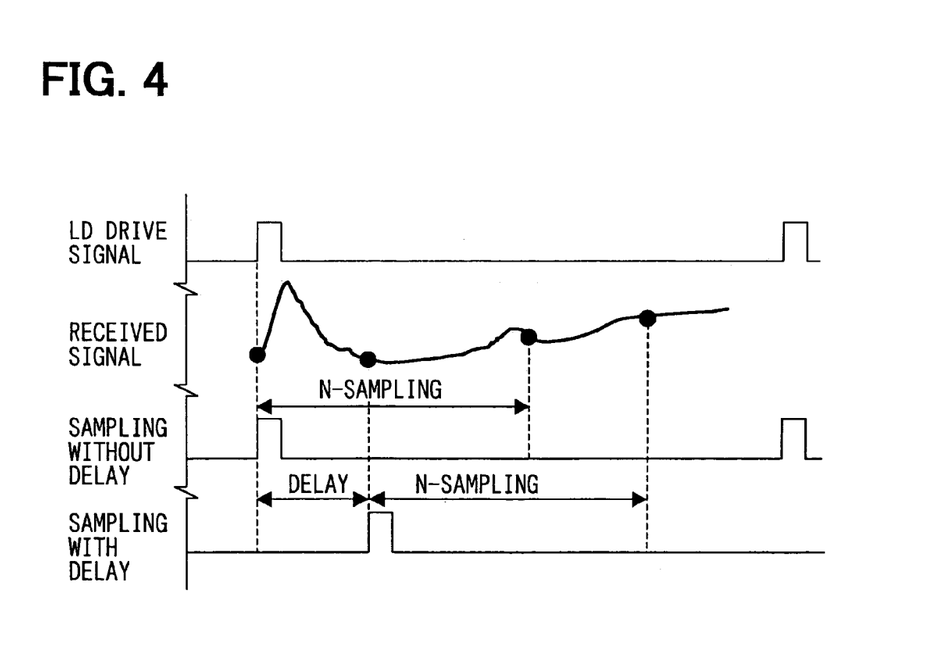
FIG. 4 is a signal diagram showing signals developed in a process carried out by a delay block of the detection circuit to provide a delay time to a sampling start command of A/D conversion processing.

That is, as shown in FIG. 4, in dependence on the delay request signal received from the laser radar CPU 70, the delay block 88 either gives a sampling start command to the A/D conversion block 87 without a delay time from the LD-driving signal or gives a delayed sampling start command to the A/D conversion block 87 at a point of time coinciding with the end of a delay time from the LD-driving signal. Thus, in this detection circuit 86, it is possible to prevent the detection performance from lowering while using a sampling-point count smaller than a count required for a detection distance of beam-reflecting bodies to be detected by properly changing the timing to give the sampling start command to the AND conversion block 87.

Typically, the timing to generate the sampling start command in the laser radar sensor 5 of the vehicle is set initially by setting the delay time at 0, that is, by having no delay time, to detect a beam-reflecting body such as a preceding vehicle existing in a distance range close to the vehicle. When a beam-reflecting body such as a preceding vehicle existing in a distance range close to the vehicle is not detected, the laser radar CPU 70 outputs a delay request signal to the detection circuit 86 to change the delay time or, to be more specific, to increase the delay time from 0 corresponding to no delay time to a value representing a delay time.

With the delay time increased, the range of detection becomes a distance range farther away from the vehicle. When the change in delay time covers both the short-distance range and the longer-distance range as an entire distance range of beam-reflecting bodies to be detected, this two-stage delay-time change is sufficient. The delay time however can be changed at three or more stages to cover typically a short-distance range, a middle-distance range and a long-distance range or to set partially overlapping distance ranges.

It is to be noted that, when the detection range of a vehicle is set at a short-distance range and a beam-reflecting body such as a preceding vehicle on the travel lane in front of the vehicle is detected, the operation to change the detection range from the short-distance range to a longer-distance range is canceled. This is because the laser radar sensor 5 of the vehicle is an apparatus required to detect a preceding vehicle or an obstruction closest to the vehicle.

In addition, when after a beam-reflecting body in the short-distance range is not detected and the laser radar CPU 70 employed in the vehicle changes the detection range from the short-distance range to a longer-distance range, another vehicle may conceivably interrupt the travel lane in front of the vehicle from an adjacent travel lane. In this case, the laser radar CPU 70 needs to switch the detection range from the longer-distance range back to the short-distance range. Thus, the detection distance of the laser radar sensor 5 is switched from a short-distance range to a longer-distance range and vice versa as long as no beam-reflecting body exists in the short-distance range.

The parallel integration process block 89 of the vehicle selects a predetermined number of received signals corresponding to the same predetermined number of radiated laser beams adjacent to each other in the X-axis direction or the transversal direction of the vehicle from received signals completing an A/D conversion process in the A/D conversion block 87. Then, the parallel integration process block 89 puts the selected received signals in a group of received signals to be integrated. Finally, the parallel integration process block 89 integrates the received signals pertaining to the integration group. That is, the parallel integration process block 89 carries out an integration process on received signals in integration-group units in all but the same procedure as described with reference to FIGS. 7 and 8.

In this way, in the integration processing, received-signal components included in received signals corresponding to laser beams reflected by a beam-reflecting body can be amplified, allowing the beam-reflecting body to be detected even when received-signal components are small and difficult to distinguish from noise components. In addition, the received signals pertaining to an integration group are integrated by shifting the integration group by an interval corresponding to one received signal at one time. Thus, lowering of the detection resolution in the transversal direction of the vehicle can be suppressed to a minimum. It is to be noted that, while the number of received signals pertaining to an integration group is set to four in this embodiment as shown in FIGS. 7 and 8, the number of received signals pertaining to an integration group can be set at any value depending on the size of a beam-reflecting body to be detected, the angle formed by two adjacent radiated laser beams and a maximum detection distance.

Figure 5:
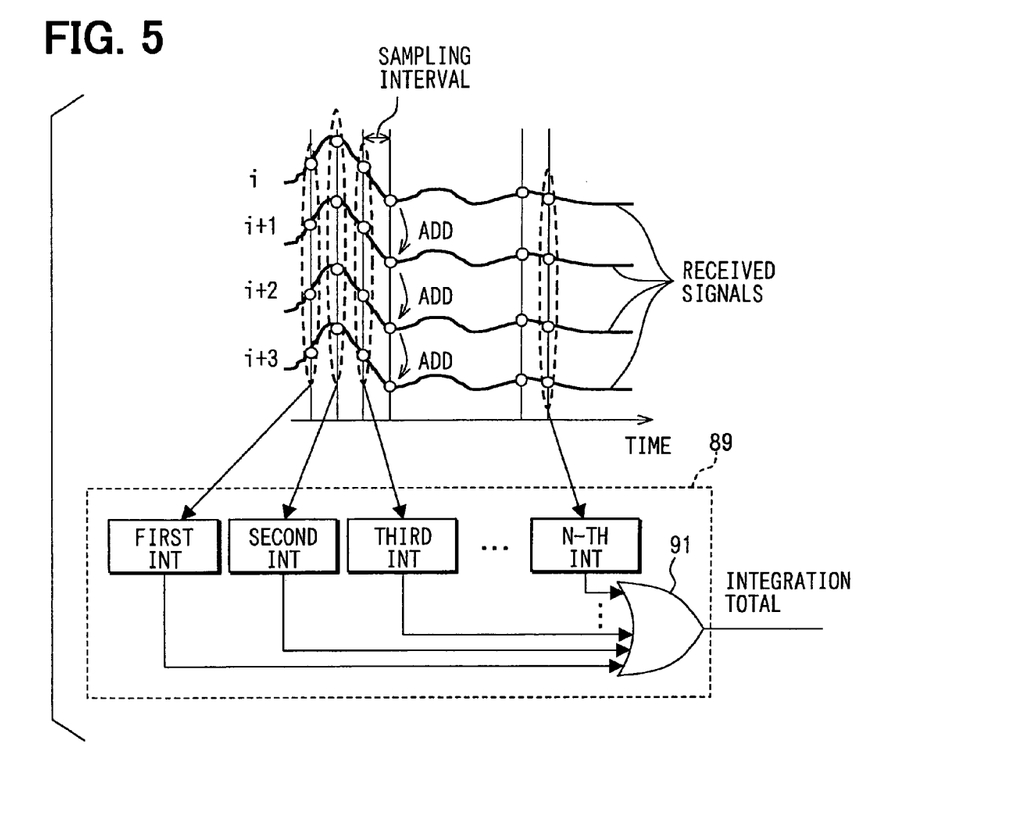
FIG. 5 is a schematic diagram showing a parallel integration process.
Figure 6:
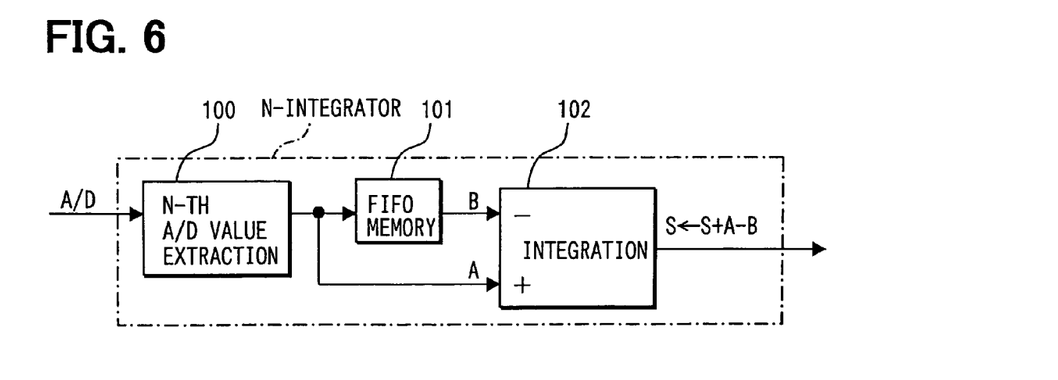
FIG. 6 is a block diagram showing an integration circuit.

The parallel integration process block 89 is described in detail by referring to FIGS. 5 and 6. As will be described later, an integration process is carried out by the parallel integration process block 89 every time an A/D conversion process is carried out on received signals each identified by a scan number. That is, the interval of the integration process is the same as the sampling interval of the A/D conversion process. For a 50 MHz sampling frequency of the A/D conversion process, for example, the integration process needs to be carried out at the interval of 20 ns corresponding to the sampling frequency of 50 MHz. The interval of 20 ns implies that the integration process is carried out at a very high speed. Since the amount of integration processing is large, it is difficult to carry out the integration processing through execution of software by a CPU. For this reason, the parallel integration process block 89 is implemented by hardware comprising discrete components or hardware such as an FPGA or an ASIC.

A circuit configuration of the hardware implementing the parallel integration process block 89 includes N integrators from the first integrator to the N-th integrator as shown in FIG. 5 where N is the number of sampling points taken from each of received signals as sampling points subjected to an A/D conversion process in the A/D conversion block 87. Integration results output at the same time by the N integrators 1 to N are supplied to an OR circuit 91 to be combined to produce a result of integration for all distances in a set detection range at a rate of 50M times per second.

The first to N-th integrators have the same circuit configuration. FIG. 6 is a diagram showing a typical circuit configuration of each of the integrators. As shown in the figure, the integrator has a digital-value extraction unit 100 for extracting A/D conversion results of only the Nth sampling points from input A/D conversion results of all sampling points. The A/D conversion results extracted by the digital-value extraction unit 100 are supplied to a FIFO (First In First Out) memory 101 to be stored therein and an integration circuit 102.

When the number of received signals included in an integration group is 4, the FIFO memory 101 has a configuration allowing four A/D conversion values to be stored in the FIFO memory 101. As described above, the digital-value extraction unit 100 sequentially receives only A/D conversion values obtained at the N-th sampling points as shown in FIG. 5. It is assumed for example that, in the N-th integrator, a specific A/D conversion value of a received signal corresponding to a laser beam i+3 is supplied from the digital-value extraction unit 100 to the FIFO memory 101 to be stored in the FIFO memory 101. In this case, an A/D conversion value preceding the specific A/D conversion value by four A/D conversion values is expelled from the FIFO memory 101. The A/D conversion value preceding the specific AD conversion value by four A/D conversion values is a value of a received signal corresponding to a laser beam i−1.

The A/D conversion value output from the FIFO memory 101 is supplied to a subtraction terminal B of the integration circuit 102. The A/D conversion value supplied to the subtraction terminal B is subtracted from an integration result S held in the integration circuit 102. At the same time, the digital-value extraction unit 100 also supplies the A/D conversion value of a received signal corresponding to a laser beam i+3 to an addition terminal A of the integration circuit 102 to be added to the integration result S held in the integration circuit 102.

Thus, as the digital-value extraction unit 100 of the N-th integrator sequentially supplies A/D conversion values of received signals corresponding to four laser beams i to i+3 to the FIFO memory 101, the FIFO memory 101 sequentially outputs A/D conversion values of received signals corresponding to laser beams i to i−1 to the integration circuit 102 to be subtracted from an integration result S. At the same time, the digital-value extraction unit 100 also sequentially supplies A/D conversion values of received signals corresponding to laser beams i to i+3 to the integration circuit 102 to be added to the integration result S. As a result, at the point of time the A/D conversion value of a received signal corresponding to the laser beam i+3) is received, the integration result S output by the N-th integrator is equal to the sum of only A/D conversion values obtained at the Nth sampling point for received signals corresponding to laser beams i to i+3.

In addition, at the point of time the A/D conversion value of a received signal corresponding to the laser beam i+4 is supplied to the N-th integrator in a state not shown in FIG. 5, the integration result S output by the N-th integrator is equal to the sum of only A/D conversion values obtained at the Nth sampling point for received signals corresponding to laser beams i+1 to i+4, which are laser beams shifted from the laser beams i to i+3 respectively by one laser beam. In this way, each of the integrators outputs an integration value S of A/D conversion values obtained at a sampling point assigned to the integrator for received signals pertaining to an integration group while shifting the integration group by an interval corresponding to one received signal at one time.

As described above, the integration group is a group of received signals subjected to an integration process.

It is to be noted that, in each of the integrators, the contents of the integration circuit 102 and, hence, the integration result S, as well as digital data stored in the memory 101 are initialized at 0. Thus, each of the integrators to is capable of outputting the integration result for each integration group, which includes received signals subjected to an integration process, including the integration result of the integration group consisting of received signals corresponding to laser beams identified by laser-beam numbers 1 to 4.

As described above, each of the first to N-th integrators has a FIFO memory 101 for always storing four A/D conversion results obtained at a sampling point assigned to the integrator for the four most recent received signals. That is why as many integrators (first to N-th) as sampling points are required and connected in parallel to the OR circuit 91.

In this embodiment, as shown in FIG. 2B, the laser radar sensor 5 includes the delay block 88 allowing the number of sampling points in the A/D conversion block 87 to be made smaller than the sampling-point count required for a detection distance from the laser radar sensor 5 to beam-reflecting bodies to be detected by the laser radar sensor 5. Thus, even when as many integrators as sampling points are provided in the parallel integration process block 89, being connected in parallel to the OR circuit 91, the size of the hardware, that is, the circuit scale, can be reduced to be less than a size that would otherwise be required for the detection distance. The embodiment offers a merit of simple integration of the hardware into an IC chip for a case in which the hardware circuit including the parallel integration process block 89 is to be accommodated in an IC chip.

Nevertheless, the processing of the parallel integration process block 89 can be carried out not only by a hardware circuit, but also by execution of software in a CPU provided that the CPU has a sufficient processing power. When such a CPU is available, the processing load of the integration process according to the embodiment can be reduced so that the embodiment offers other merits such as a shortened processing time or a reduced memory capacity.

As described above, the OR circuit 91 employed in the parallel integration process block 89 combines the integration results generated by the first to N-th integrators to produce a result of integration total. The integration results generated by the integrators are output at times shifted from each other by an interval between two adjacent sampling points as shown in FIG. 5. Thus, by setting the integration result output by each of the integrators at 0 except during the sampling interval corresponding to a distance computed by the integrator itself and computing the OR logical sum of the integration results output by all the integrators, a single integration result can be obtained as the output of the OR circuit 91. That is, in a sampling interval, the specific integration result generated by only an integrator associated with a distance corresponding to the sampling interval is output by the OR circuit 91 because the integration results generated by the other integrators are set at 0. Thus, the OR logical sum of the integration results output by all the integrators includes only the specific integration result not mixed with the other integration results generated by the other integrators.

The integration result output by the OR circuit 91 employed in the parallel integration process block 89 as an output for each integration group consisting of received signals to be integrated is supplied to a time measurement block 90 as shown in FIG. 2B. The time measurement block 90 has a comparator and a time difference computation circuit, which are not shown in the figure. The comparator is a component for comparing the integration result received from the OR circuit 91 with a reference value. The time difference computation circuit is a component for computing a time difference representing the distance between the laser radar sensor 5 and the beam-reflecting body based on the output of the comparator.

When the integration result is greater than the reference value, the comparator outputs a detection signal to the time difference computation circuit. Based on the detection signal received from the comparator, the time difference computation circuit detects a rise time and a fall time. The rise time is a point of time at which the integration result exceeds the reference value. On the other hand, the fall time is a point of time at which the integration result falls down to a value below the reference value. Then, the time difference computation circuit estimates a peak-value occurrence time, at which the integration result reaches its peak value, based on the rise time and the fall time.

After the time difference computation circuit estimates the peak-value occurrence time as described above, the time difference computation circuit measures a difference between the peak-value occurrence time and a time at which the laser beam corresponding to the peak value is generated. The difference between the peak-value occurrence time and the time at which the laser beam corresponding to the peak value is generated is encoded into a binary digital signal, which is then output to the laser radar CPU 70.

The laser radar CPU 70 computes the distance between the laser radar sensor 5 and the beam-reflecting body from the time difference received from the time measurement block 90. Then, the laser radar CPU 70 generates positional data based on the distance as well as the scan angles θx and θy. Specifically, based on the distance as well as the scan angles θx and θy, the laser radar CPU 70 computes the positional data of the beam-reflecting body in a X-Y-Z orthogonal coordinate system with the center of the laser radar taken as the origin (0, 0, 0), the transversal direction of the vehicle taken as the X-axis, the vertical direction taken as the Y-axis and the forward-movement direction of the vehicle taken as the Z-axis. Then, the laser radar CPU 70 supplies the positional data of the beam-reflecting body in the X-Y-Z orthogonal coordinate system to the control ECU 3 as measurement data.

It is to be noted that, in a process to generate positional data based on an integration signal indicating the distance relative to a beam-reflecting body as well as the scan angles θx and θy, as the scan angle θx of a laser beam for the integration signal, the laser radar CPU 70 uses the scan angle θx of a laser beam at the center of a plurality of laser beams represented by received signals subjected to an integration process to produce the integration signal.

The control ECU 3 recognizes the beam-reflecting body based on the measurement data received from the laser radar sensor 5 and executes inter-vehicle distance control for controlling the speed of the vehicle by outputting driving signals to the brake driver 19, the throttle driver 21 and the automatic transmission controller 23. In addition, when the recognized beam-reflecting body has been existing in a predetermined warning area for a predetermined interval of time, for example, the control ECU 3 also carries out a warning determination process at the same time. The beam-reflecting body recognized by the control ECU 3 of the vehicle includes a preceding vehicle traveling ahead of the vehicle and a stopping vehicle.

The control ECU 3 is constructed as shown in FIG. 1. The measurement data received from the laser radar sensor 5 as three-dimensional measurement data is supplied to a body recognition block 43. Based on the three-dimensional measurement data, the body recognition block 43 computes the position (X, Y, Z) of the center of the beam-reflecting body and the size (W, D, H) of the beam-reflecting body where symbol W, D and H denote the width, depth and height of the beam-reflecting body. In addition, based on changes in center position (X, Y, Z) with the lapse of time, the body recognition block 43 also finds the velocity (Vx, Vy, Vz) of the beam-reflecting body as a speed relative to the vehicle.

Based on a vehicle speed received from a vehicle speed computation block 47 as the speed of the vehicle and the computed relative velocity (Vx, Vy and Vz), the body recognition block 43 determines whether the detected beam-reflecting body is a stopping beam-reflecting body or a moving beam-reflecting body. Based on a result of the determination and the position (X, Y, Z) of the center of the beam-reflecting body, the body recognition block 43 may recognize the beam-reflecting body as a beam-reflecting body having an effect on the traveling state of the vehicle, displaying the distance relative to the beam-reflecting body on the distance display unit 15. It is to be noted that the vehicle speed computation block 47 finds the speed of the vehicle based on a detection value generated by the vehicle speed sensor 7.

In addition, a steering-angle computation block 49 finds a steering angle based on a signal generated by the steering sensor 27. A yaw-rate computation block 51 computes a yaw rate from a signal generated by the yaw-rate sensor 28. Based on the vehicle speed generated by the vehicle speed computation block 47, the steering angle output by the steering-angle computation block 49 and the yaw rate supplied by the yaw-rate computation block 51, the curve-radius (curvature-radius) computation block 57 finds a curve radius (or a curvature radius) R. Then, based on data such as the curve radius R and the center position coordinates (X, Z), the body recognition block 43 computes the probability that the beam-reflecting body is a preceding vehicle and the probability that the preceding vehicle is traveling on the same travel lane as the vehicle.

A sensor abnormality detection block 44 determines whether or not data found by the body recognition block 43 is values in abnormal ranges. When any data found by the body recognition block 43 is a value in the abnormal range, the sensor abnormality detection block 44 displays the abnormality on the sensor-abnormality display unit 17.

On the other hand, based on various kinds of data received from the body recognition block 43, a preceding vehicle determination block 53 recognizes a preceding vehicle and finds a distance Dz in the Z-axis direction between the vehicle and the preceding vehicle as well as a relative velocity Vz of the vehicle as a velocity relative to the preceding vehicle. Then, based on the distance Dz between the vehicle and the preceding vehicle, the relative velocity Vz, the setting state of the cruise control switch 26, the depression state of the brake switch 9, information received from the throttle position sensor 11 on an open position of a throttle and a sensitivity-setting value of the warning sensitivity setter 25, a block 55 comprising an inter-vehicle distance control unit and a warning determination unit determines whether or not a warning is to be issued in a warning determination process and determines the substance of vehicle speed control in a cruise determination process.

A result of the determination is output to the warning sound generator 13 when a warning is required. In the case of the cruise determination process, control signals are output to the automatic transmission controller 23, the brake driver 19 and the throttle driver 21 to execute required control. In addition, in the execution of the control, necessary display signals are output to the distance display unit 15 to inform the driver of conditions.

The above embodiment may be modified in many ways. Some modifications are as follows.

(1) The delay time may be changed under other conditions. In the event of a traffic congestion, for example, there are many cases in which a preceding vehicle exists in a range of short distances from the vehicle. For this reason, traffic information showing roads on which the vehicle must travel is obtained from a navigation apparatus or the like. When a driver determines that there is a traffic congestion based on the traffic information, it is possible to set the delay time at 0 or at a small value. In addition, a switch can be provided for manually changing the delay time continuously or through several stages. With such a switch, a driver can arbitrarily change the detection range of the radar apparatus.

(2) The group of received signals subjected to an integration process can be shifted by an interval corresponding to a plurality of received signals, which are fewer than received signals pertaining to the integration group. In this way, the detection resolution of the integration process can be improved at least over that of an integration process in which received signals are divided into groups each subjected to an integration process.

(3) The received signals to be integrated may represent not only radiated laser beams adjacent to each other in the X-axis direction, but also radiated laser beams adjacent to each other in the Y-axis direction. In addition, the range of radiated laser beams adjacent to each other may be spread over a plurality of scan lines in the X-axis and Y-axis directions.

(4) The body recognition block 43 may transform the coordinate system of the distance as well as the scan angles θx and θy to the X-Y-Z orthogonal coordinate system.

What is claimed is:

1. A radar apparatus for a vehicle, comprising:
a radar means for successively radiating a plurality of transmission waves over a predetermined angular range spread at least in a transversal direction of the vehicle and outputting received analog signals representing intensities of reflected waves received as a result of reflection of the radiated transmission waves by a beam-reflecting body;
a group-setting means for setting a plurality of integration groups of received analog signals to be integrated, each integration group including a predetermined number of the received analog signals successively output by the radar means, adjacent two of the integration groups being shifted by an interval corresponding to a plurality of successively received analog signals, which are less than the predetermined number of the received analog signals, so that the adjacent two of the integration groups partially overlap each other sharing some of the received analog signals;
an analog/digital conversion means for carrying out a fixed number of sampling operations at a same fixed number of sampling points during a predetermined sampling interval to sample the received analog signals pertaining to each of the integration groups set by the group-setting means and for converting the sampled received analog signals into pieces of digital data;

a digital data integration means for integrating the pieces of digital data produced by the analog/digital conversion means at the same sampling point as a result of analog/digital conversion of the received analog signals pertaining to each of the integration groups;

a detection means for detecting the beam-reflecting body based on an integration result produced by the digital-data integration means at each of the sampling points as a result of integrating the pieces of digital data; and a delay-time adjustment means for adjusting a delay time of a timing to start the sampling operations carried out by the analog/digital conversion means to sample the received analog signals as a delay time relative to a timing to radiate the transmission waves by the radar means.

2. A radar apparatus for a vehicle according to claim 1, wherein the adjacent two of the integration groups are shifted by an interval corresponding to one received analog signal.

3. A radar apparatus for a vehicle according to claim 1, wherein the delay-time adjustment means increases the delay time when the beam-reflecting body is not detected at a small value of the delay time.

4. A radar apparatus for a vehicle according to claim 1, wherein the delay-time adjustment means increases and decreases the delay time repeatedly in a periodical manner.

5. A radar apparatus for a vehicle according to claim 1, wherein the delay-time adjustment means decreases the delay time based on traffic congestion of a road on which the vehicle travels.

6. A radar apparatus for a vehicle according to claim 1, wherein the delay-time adjustment means has a delay-time modification means for manually changing the delay time.

* * * * *